UNITED STATES PATENT OFFICE 2,659,740

1,5-DIHYDROXY-8-HALO-4-AMINOANTHRA-QUINONE COMPOUNDS

Joseph B. Dickey and Edmund B. Towne, Kingsport, Tenn., assignors to Eastman Kodak Company, Rochester, N. Y., a corporation of New Jersey No Drawing. Application August 17, 1951,
Serial No. 242,428

8 Claims. (Cl. 260—380)

This invention relates to new anthraquinone compounds and their application to the art of dyeing or coloring. More particularly it relates to new anthraquinone compounds which color textile materials made of or containing a cellulose alkyl carboxylic acid ester having two to four carbon atoms in the acid groups thereof, especially cellulose acetate textile materials, blue shades. The invention is also directed to the preparation of the new anthraquinone compounds.

We have discovered that the new anthraquinone compounds having the probable general formula:

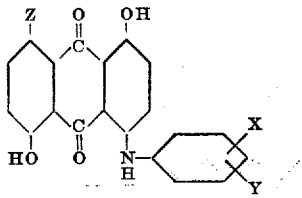

wherein X represents a monohydroxyalkyl group having one to three, inclusive, carbon atoms or a dihydroxyalkyl group having two to three, inclusive, carbon atoms, Y represents a hydrogen atom, a chlorine atom, a hydroxy group, a methoxy group or a methyl group and Z represents a halogen atom having an atomic weight of from 19 to 80 are valuable dyes for coloring textile materials made of or containing a cellulose alkyl carboxylic acid ester having two to four carbon atoms in the acid groups thereof. These dye compounds when applied to the aforesaid materials give blue dyeings which have outstanding light and gas fastness properties. They are particularly of use for the coloration of cellulose acetate textile materials.

It is an object of our invention to provide new anthraquinone compounds having good affinity for the aforesaid cellulose alkyl carboxylic acid esters textile materials and dyeing said textile materials in level blue shades which have excellent fastness to both light and gas. Another object is to provide a satisfactory process for the preparation of the new anthraquinone compounds of the invention. A particular object is to provide new anthraquinone compounds which are especially of value for the dyeing of cellulose acetate textile materials.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The remarkable resistance of the dyestuffs of the present invention to gas fading is shown by the fact that the dyeings obtained therewith on cellulose acetate textile materials undergo very little alteration in strength or shade even after exposure to as many as 6 AATCC gas-cycles. By contrast, various aminoanthraquinones such as 1,4-dimethylaminoanthraquinone, 1-methylamino - 4 - methoxyethylaminoanthraquinone, 1-methylamino - 4 - β - hydroxyethylaminoanthraquinone, 1,4-diaminoanthraquinone, 1,4,5,8-tetraaminoanthraquinone, 1,4 - di - β - hydroxyethylamino - 5,8 - dihydroxyanthraquinone and 1-amino-4-methylaminoanthraquinone - 2 carboxylic amide, which are used extensively to color cellulose acetate textile materials, are markedly changed after only 1 AATCC gas-cycle.

Similarly the outstanding light-fastness of our new dye-stuffs is apparent from the fact that the dyeings obtained therewith on cellulose acetate textile materials show little fading after 40 to 60 hours' exposure on the Fade-O-Meter light-fastness apparatus. The significance of this will be apparent from the fact that dyeings on cellulose acetate which show little fading after 20 hours' exposure on the Fade-O-Meter light-fastness apparatus are considered good.

The new anthraquinone compounds of our invention are prepared by condensing an anthraquinone compound having the general formula:

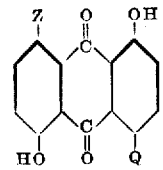

wherein Q represents a halogen atom having an atomic weight of from 35 to 80 and Z represents a halogen atom having an atomic weight of from 19 to 80 with a primary arylamine having the formula:

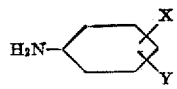

wherein X and Y have the meaning previously assigned to them. The reaction can be carried out using an excess of the amine or in the presence of a solvent or diluent which does not undergo reaction with the reactants. Solvents or diluents that can be employed include, for example, nitrobenzene, o-nitrotoluene, n-butyl alcohol, n-amyl alcohol, N,N-dimethyl formamide, N,N-diethyl formamide, N,N-dimethyl acetamide, N,N-diethyl acetamide and a glycol such as, for example, ethylene glycol, propylene glycol (propandiol-1,2), trimethylene glycol (propandiol-1,3), alpha butylene glycol (butandiol-1,2), butandiol-1,3, diethylene glycol and an ether glycol such as, for example, ethyleneglycol monomethyl ether (Methyl Cellosolve), ethyleneglycol monoethyl ether (Cellosolve), ethyleneglycol monobutyl ether (Butyl Cellosolve), diethylene glycol monobutyl ether (Butyl Carbitol), diethylene glycol monoethyl ether (Carbitol) and diethylene glycol monomethyl ether (Methyl Carbitol).

Typical of the primary arylamines used in the preparation of the anthraquinone compounds of the invention are: o-aminobenzyl alcohol, m-aminobenzyl alcohol, p-aminobenzyl alcohol, o-amino-phenylethyl alcohol, m-aminophenylethyl alcohol, p-aminophenylethyl alcohol, o-aminophenylmethylcarbinol, p-aminophenylmethylcarbinol, m-aminophenylmethylcarbinol, 4-methyl-3-aminophenylmethylcarbinol, 3-chloro-4-aminophenylmethylcarbinol, o-(CHOHCH₂CH₂OH)aniline p-(CHOHCH₂CH₂OH)aniline, o-(CHOHCH₂OH)aniline m-(CHOHCH₂OH)aniline, p-(CHOHCH₂OH)-aniline, o-(CH₂CH₂CH₂OH)aniline, p-(CH₂CH₂CH₂OH)aniline 2-methoxy-5-(CH₂CH₂CH₂OH)-aniline, 2-hydroxy-5-(CH₂CH₂CH₂OH)-aniline, 2-chloro-5-(CH₂CH₂CH₂OH)aniline, 2-methyl-5-(CH₂CH₂CH₂OH)-aniline 2-methoxy-5-(CH₂CH₂OH)-aniline, 2-chloro-5-(CH₂CH₂OH)-aniline, 3-chloro-4-aminobenzyl alcohol, 3-amino-4-methoxybenzyl alcohol, 2-amino-3-methylbenzyl alcohol, 6-amino-3-methylbenzyl alcohol, 3-amino-4-methylbenzyl alcohol, 2-methoxy-5-(CHOHCH₃)-aniline, 2-methyl-5-(CHOHCH₃)aniline, 2-methyl-3-(CH₂CH₂OH)-aniline and 2-hydroxy-5-(CH₂CH₂OH)-aniline The following examples illustrate the anthraquinone compounds of our invention and their manner of preparation:

*Example 1*

3.09 grams of 1,5-dihydroxy-4,8-dichloroanthraquinone and 15 grams of p-aminophenylethyl alcohol are heated together at 170° C. for 4 hours and the reaction mixture resulting is cooled to 50° C. 50 ccs. of ethyl alcohol are then added and the resulting reaction mixture is poured, with stirring, into 200 ccs. of cold 10% aqueous hydrochloric acid. The dye compound which precipitates is recovered by filtration, washed well with water and dried. It has the formula:

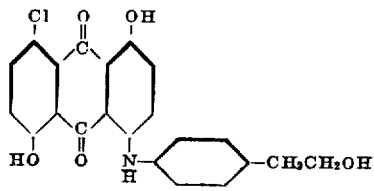

Upon crystallization from n-amyl alcohol the dye melts at 240° C.–250° C.

*Example 2*

3.09 grams of 1,5-dihydroxy-4,8-dichloroanthraquinone and 15 grams of o-aminophenylethyl alcohol are heated together at 170° C. for 4 hours and the reaction mixture resulting is then cooled to 50° C. 50 ccs. of ethyl alcohol are added and then the reaction mixture is poured, with stirring, into 200 ccs. of cold 10% aqueous hydrochloric acid. The dye compound which precipitates is recovered by filtration, washed well with water and dried. Upon recrystallization from n-amyl alcohol it melts at 140° C.–145° C.

*Example 3*

3.09 grams of 1,5-dihydroxy-4,8-dichloroanthraquinone, 2 grams of m-aminobenzyl alcohol and 50 ccs. of n-butyl alcohol are heated together under refluxing conditions for 30 hours in the presence of a small amount of copper sulfate as a catalyst. The reaction mixture is then poured, with stirring, into 200 ccs. of cold water and the dye compound which precipitates is recovered by filtration, washed well with water and dried.

2 grams of o-aminobenzyl alcohol and 2 grams of p-aminobenzyl alcohol, respectively, can be substituted for the m-aminobenzyl alcohol of the example to obtain dye compounds of our invention.

*Example 4*

3.09 grams of 1,5-dihydroxy-4,8-dichloroanthraquinone and 25 grams of m-aminophenylmethylcarbinol are heated together at 170° C.–175° C. for 4 hours and the reaction mixture resulting is worked up as described in Example 1. The dye compound obtained has the formula:

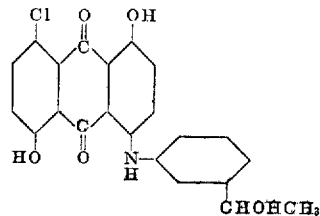

25 grams of o-aminophenylmethylcarbinol and 25 grams of p-aminophenylmethylcarbinol, respectively, can be substituted for the m-aminophenylmethylcarbinol of the example to obtain dye compounds of our invention.

*Example 5*

3.09 grams of 1,5-dihydroxy-4,8-dichloroanthraquinone and 30 grams of p-(CHOHCH₂CH₂OH)aniline are heated together under refluxing conditions for 4 hours. Upon working up the reaction mixture in accordance with the procedure described in Example 1 the dye compound having the formula:

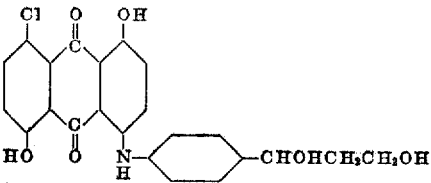

is obtained.

*Example 6*

3.09 grams of 1,5-dihydroxy-4,8-dichloroanthraquinone and 30 grams of o-(CHOHCH₂CH₂OH)aniline are heated together at 160° C. for 5 hours. The dye compound formed is recovered by working up the reaction mixture in accordance with the procedure described in Example 1.

Example 7

3.09 grams of 1,5-dihydroxy-4,8-dichloroanthraquinone and 30 grams of p-(CHOHCH₂OH) aniline are heated at 160° C. for 6 hours. The dye compound formed is recovered by working up the reaction mixture in accordance with the procedure described in Example 1.

Example 8

3 grams of 1,5-dihydroxy-4-chloro-8-fluoroanthraquinone and 25 grams of o-aminophenylethyl alcohol are heated together at 160° C.–170° C. for 4 hours. Upon working up the reaction mixture in accordance with the procedure described in Example 1 the dye compound having the formula:

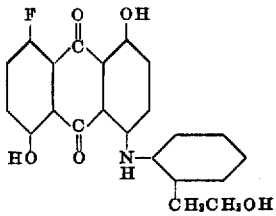

is obtained.

Example 9

5 grams of 1,5-dihydroxy-4,8-dibromoanthraquinone and 25 grams of p-aminophenylethyl alcohol are refluxed together for 4 hours. Upon working up the reaction mixture in accordance with the procedure described in Example 1 the dye compound having the formula:

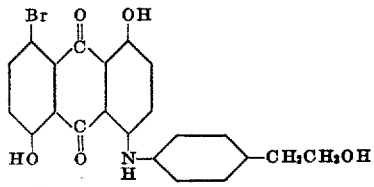

is obtained.

Example 10

3.09 grams of 1,5-dihydroxy - 4,8 - dichloroanthraquinone and 25 grams of 2-methoxy-5-(CH₂CH₂OH)-aniline are refluxed together for 5 hours. The dye compound formed is recovered by working up the reaction mixture in accordance with the procedure described in Example 1.

Example 11

5 grams of 1,5-dihydroxy-4,8-dibromoanthraquinone and 25 grams of 2 - chloro - 5-(CH₂CH₂OH)-aniline are refluxed together for 5 hours. Upon working up the reaction mixture in accordance with the procedure described in Example 1 the dye compound having the formula:

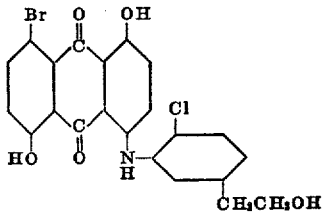

is obtained.

Example 12

3.09 grams of 1,5-dihydroxy - 4,8 - dichloroanthraquinone and 25 grams of 2-methyl-5-(CHOHCH₃)-aniline are refluxed together for 5 hours. The dye compound formed is recovered by working up the reaction mixture in accordance with the procedure described in Example 1.

Example 13

3.09 grams of 1,5-dihydroxy-4,8-dichloroanthraquinone and 25 grams of 2-hydroxy-5-(CH₂CH₂OH)-aniline are refluxed together for 6 hours. The dye compound formed is recovered by working up the reaction mixture in accordance with the procedure described in Example 1.

Example 14

5 grams of 1,5-dihydroxy-4,8-dibromoanthraquinone and 25 grams of 6-amino-3-methylbenzyl alcohol are refluxed together for 6 hours. The dye compound formed is recovered by working up the reaction mixture in accordance with the procedure described in Example 1.

Example 15

3.09 grams of 1,5-dihydroxy-4,8-dichloroanthraquinone and 15 grams of 3-amino-4-methoxybenzyl alcohol are refluxed together for 4 hours. The dye compound formed is recovered by working up the reaction mixture in accordance with the procedure described in Example 1.

Example 16

3.09 grams of 1,5-dihydroxy-4,8-dichloroanthraquinone and 20 grams of 3-chloro-4-aminophenylmethylcarbinol are refluxed together for 5 hours. The dye compound formed is recovered by working up the reaction mixture in accordance with the procedure described in Example 1.

Example 17

5 grams of 1,5-dihydroxy-4,8-dibromoanthraquinone and 18 grams of 4-methyl-3-aminophenylmethylcarbinol are refluxed together for 4 hours. The dye compound formed is recovered by working up the reaction mixture in accordance with the procedure described in Example 1.

Example 18

3.09 grams of 1,5-dihydroxy-4,8-dichloroanthraquinone and 20 grams of m-aminophenylethylcarbinol are refluxed together for 5 hours. The dye compound formed is recovered by working up the reaction mixture in accordance with the procedure described in Example 1.

m-Aminophenylethyl alcohol is prepared as follows: m-nitrophenylacetic acid is reduced at 50° C.–55° C. to m-aminophenylacetic acid in ethyl alcohol over Raney nickel. Ethyl alcohol is removed in vacuo from the reaction mixture and the residue consisting essentially of m-aminophenylacetic acid is placed in a Soxhlet apparatus and reduced to m-aminophenylethyl alcohol in the presence of a boiling ethyl ether solution of a large excess of lithium aluminum hydride. Upon working up the reaction mixture m-aminophenylethyl alcohol boiling at 135° C.–138° C./2 mm. is obtained.

The p-(CHOHCH₂CH₂OH) aniline used in Example 5 was prepared as a viscous oil by nitrating the diacetate of 3-(phenyl)-1,3-propanediol with fuming nitric acid and acetic anhydride at 20° C.–30° C. The diacetate of 3-(p-nitrophenyl)-1,3-propanediol separated as a solid when the nitration mixture was poured into ice water and was recovered by filtration. Upon reduction of the nitro group with hydrogen in the presence of Raney nickel catalyst, followed by hydrolysis of the acetate groupings p-(CHOHCH₂CH₂OH) aniline was obtained.

The isomer, o-(CHOHCH₂CH₂OH) aniline was recovered by extracting the nitration mixture above with ether. The diacetate of 3-(o-nitrophenyl)-1,3-propanediol was recovered from the ether extract and reduced and hydrolyzed to obtain o-(CHOHCH₂CH₂OH) aniline.

o-(CHOHCH₂CH₂OH) aniline can also be prepared by reducing 3-(o-nitrophenyl)-1,3-propanediol [Ber. 15, 286] with hydrogen in the presence of Raney nickel catalyst.

The 3-amino-4-methoxybenzyl alcohol used in Example 15 was prepared as follows:

71.5 grams of 4-methoxy-3-nitrobenzaldehyde in 500 ccs. of ethyl alcohol were placed in a suitable pressure vessel and hydrogenated with hydrogen over Raney nickel at 1400 to 1600 pounds per square inch at a temperature of 85° C.-100° C. Upon completion of the hydrogenation reaction the reaction mixture was evaporated to dryness and the residue was recrystallized from benzene. 32 grams of 3-amino-4-methoxybenzyl alcohol melting at 95° C.-97° C. were obtained.

The 3 - chloro - 4 - aminophenylmethylcarbinol used in Example 16 was prepared as follows:

60 grams of 3,4-dichloroacetophenone, 200 cc. of 29 per cent aqueous ammonia and 1 gram of CuO were heated in an autoclave at 250° C.-260° C. for 8 hours. The reaction mixture was filtered and the product obtained on the filter was washed with stirring, over a period of 30 minutes while a product melting at 118° C.-122° C. were obtained. The product thus obtained was hydrogenated with hydrogen over Raney nickel at 100° C.-105° C. in dioxane at 1200 pounds per square inch. Upon completion of the hydrogenation reaction the dioxane was distilled off leaving 42 grams of 3-chloro-4-aminophenylmethylcarbinol melting at 91° C.-94° C.

The 4-methyl-3-aminophenylmethylcarbinol used in Example 17 was obtained as follows:

40 grams of p-methylacetophenone were dissolved in 180 cc. of 96 per cent H₂SO₄ and the resulting solution was cooled to —20° C. Then a mixture of 36 cc. of 96 per cent H₂SO₄ and 28 cc. of nitric acid (sp. gr. 1.5) was added with stirring, over a period of 30 minutes while maintaining the temperature below —20° C. After 15 minutes' additional stirring the reaction mixture was poured onto ice and filtered. The product recovered on the filter was washed acid-free with water and dried. After recrystallization from dilute acetic acid 21 grams of a product melting at 52° C.-56° C. were obtained. The product thus obtained was dissolved in 50 cc. of ethyl alcohol and hydrogenated with hydrogen over Raney nickel at 110° C. at 1000 pounds per square inch. Upon completion of the hydrogenation reaction the ethyl alcohol was removed by distillation and the residue was recrystallized from toluene. 13 grams of 4-methyl-3-aminophenylmethylcarbinol melting at 61° C.-65° C. were obtained.

The m-aminophenylethylcarbinol used in Example 18 was prepared as follows:

40 grams of propiophenone were dissolved at 0° C. in 180 cc. of 96 per cent sulfuric acid and 28 cc. of nitric acid (sp. gr. 1.5) was added, with stirring over a period of 30 minutes while maintaining the temperature below —20° C. About 30 minutes after complete addition the mixture was allowed to come to —10° C. and then poured onto ice and filtered. The product obtained on the filter was recrystallized from dilute acetic acid. 26 grams of a product melting at 94° C.-96° C. were obtained. The product thus obtained was hydrogenated with hydrogen over Raney nickel in 50 cc. of ethyl alcohol at 110° C. and a pressure of 1200 pounds per square inch. Then the ethyl alcohol was removed by distillation and the residue was recrystallized from toluene. 19 grams of m-aminophenylethyl carbinol melting at 65° C.-68° C. were obtained.

The new anthraquinone dye compounds of our invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70° C.-90° C., but any suitable temperature can be used. Thus, the textile material such as cellulose acetate, for example, to be dyed or colored is ordinarily added to the dye bath at a temperature lower than that at which the main portion of the dyeing is to be effected, a temperature approximating 45° C.-55° C., for example, following which the temperature is raised to that selected for carrying out the dyeing operation. The temperature at which the dyeing is conducted may, of course, be varied somewhat, depending upon the particular material undergoing coloration. As is understood by those skilled in the dyeing art, the intensity of dyeing can be varied by varying the proportion of dye to material undergoing coloration. The amount of dye used can be, for example, ⅓% (by weight) of that of the textile material, although lesser or greater amounts of dye can be used.

1,5-dihydroxy-4-chloro-8-fluoroanthraquinone is prepared by chlorinating 1,5-dihydroxy-8-fluoroanthraquinone in accordance with the chlorination procedure described in German Patent 167,743. Similarly, 1,5-dihydroxy-4-bromo-8-fluoroanthraquinone is prepared by brominating 1,5 - dihydroxy - 8 - fluoroanthraquinone using standard bromination procedures.

We claim:

1. The anthraquinone compounds having the general formula:

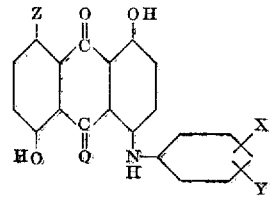

wherein X represents a member selected from the group consisting of a monohydroxyalkyl group having one to three, inclusive, carbon atoms and a dihydroxyalkyl group having two to three, inclusive, carbon atoms, Y represents a member selected from the group consisting of a hydrogen atom, a chlorine atom, a hydroxy group, a methoxy group and a methyl group and Z represents a halogen atom having an atomic weight of from 19 to 80.

2. The anthraquinone compounds having the general formula:

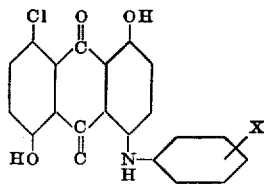

wherein X represents a monohydroxyalkyl group having one to three, inclusive, carbon atoms.

3. The anthraquinone compounds having the general formula:

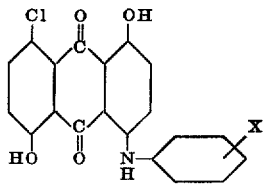

wherein X represents a dihydroxyalkyl group having two to three, inclusive, carbon atoms.

4. The anthraquinone compound having the formula:

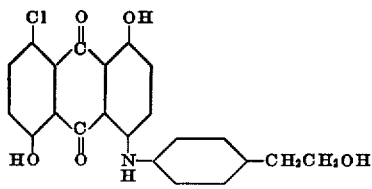

5. The anthraquinone compound having the formula:

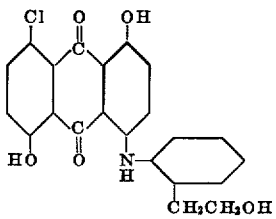

6. The anthraquinone compound having the formula:

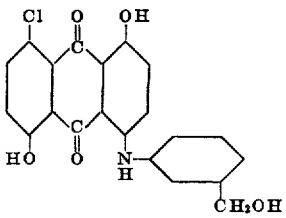

7. The anthraquinone compound having the formula:

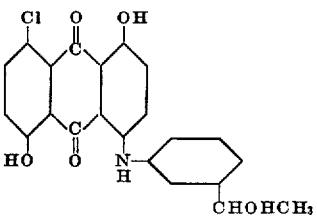

8. The anthraquinone compound having the formula:

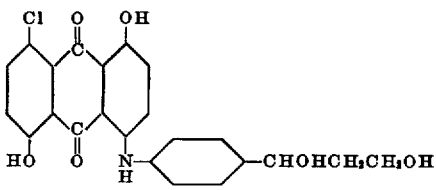

JOSEPH B. DICKEY.
EDMUND B. TOWNE.

References Cited in the file of this patent

UNITED STATES PATENTS

| Number | Name | Date |
|---|---|---|
| 2,053,274 | Ellis et al. | Sept. 8, 1936 |
| 2,341,891 | Wuertz et al. | Feb. 15, 1944 |
| 2,391,011 | Dickey et al. | Dec. 18, 1945 |
| 2,466,008 | Dickey | Apr. 5, 1949 |
| 2,480,269 | Seymour et al. | Aug. 30, 1949 |
| 2,485,197 | Grossmann | Oct. 18, 1949 |

Certificate of Correction

Patent No. 2,659,740                                              November 17, 1953

Joseph B. Dickey et al.

It is hereby certified that error appears in the printed specification of the above numbered patent requiring correction as follows:

Column 7, line 40, for "stirring, over a period of 30 minutes while" read *water until neutral and dried. 48 grams of*;

and that the said Letters Patent should be read as corrected above, so that the same may conform to the record of the case in the Patent Office.

Signed and sealed this 19th day of January, A. D. 1954.

[SEAL]

ARTHUR W. CROCKER,
*Assistant Commissioner of Patents.*